Figures 1, 2:
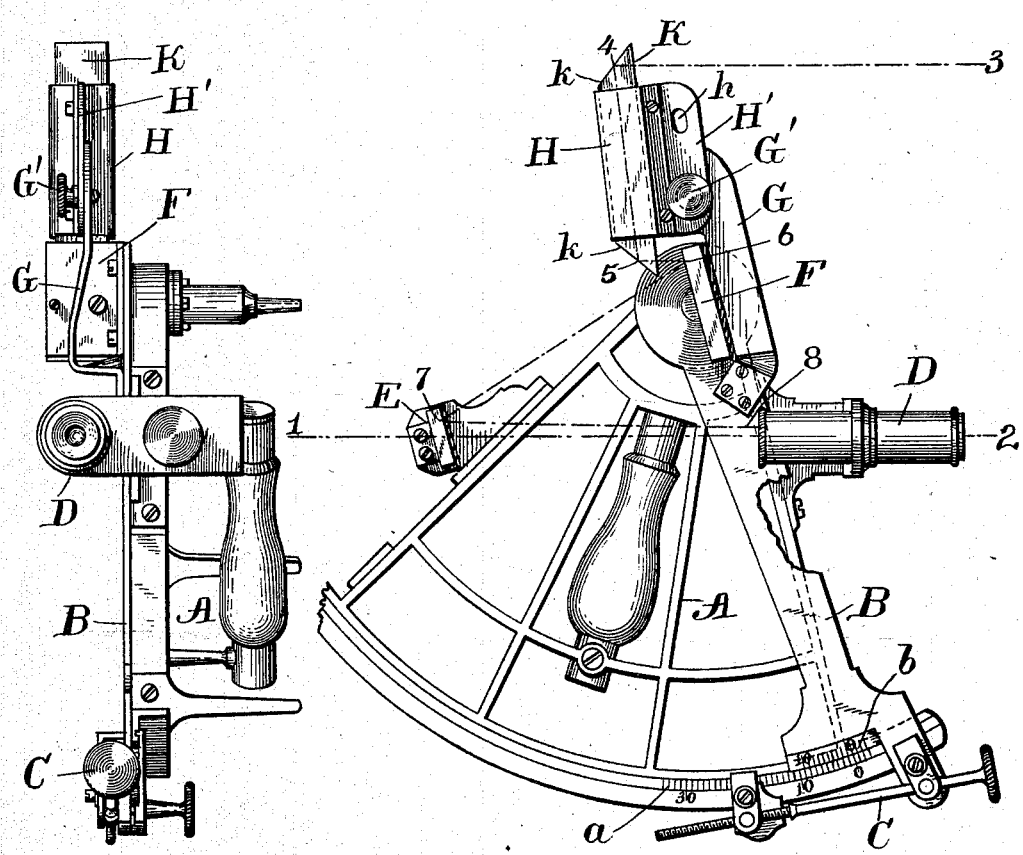

No. 714,276. Patented Nov. 25, 1902.
J. B. BLISH.
INSTRUMENT FOR NAVIGATING OR SURVEYING.
(Application filed Nov. 16, 1900.)
(No Model.) 2 Sheets—Sheet 1.

Witnesses
Percy C. Bowen
Clarence A. Bateman

Inventor
John B. Blish,
by Wilkinson & Fisher,
Attorneys.

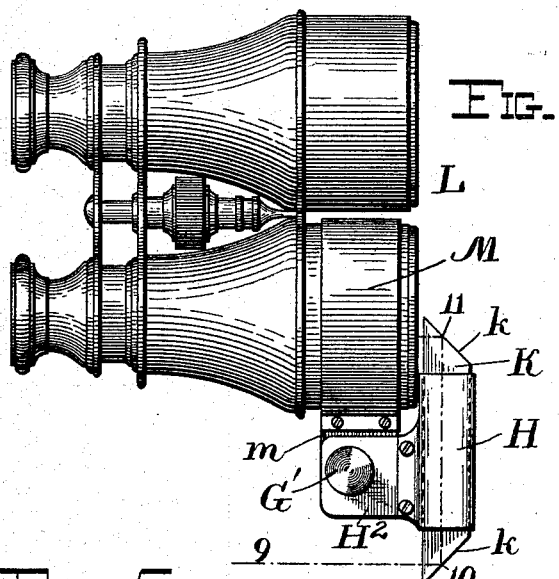
Fig. 4.
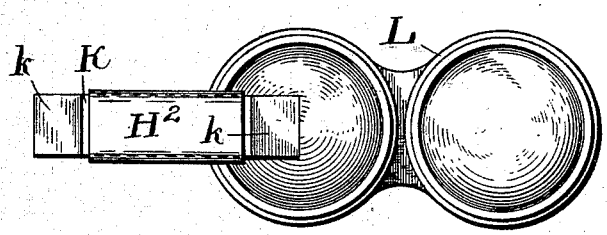
Fig. 5.
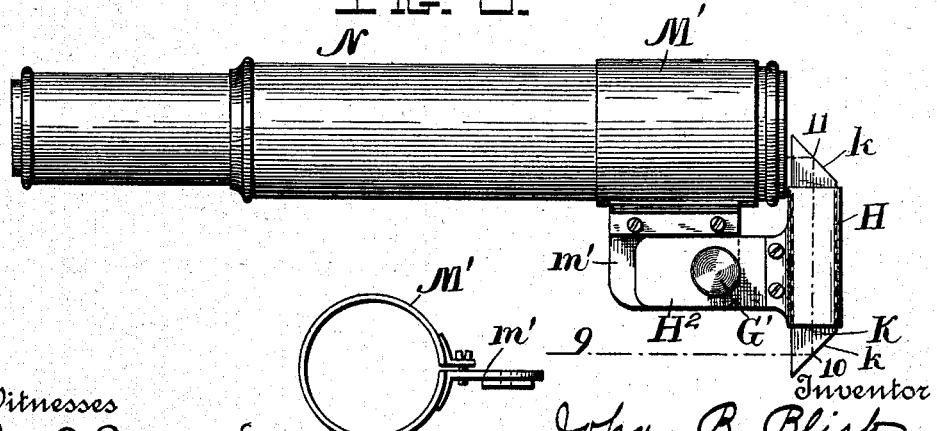
Fig. 6.
Fig. 7.

UNITED STATES PATENT OFFICE.

JOHN B. BLISH, OF THE UNITED STATES NAVY.

INSTRUMENT FOR NAVIGATING OR SURVEYING.

SPECIFICATION forming part of Letters Patent No. 714,276, dated November 25, 1902.

Application filed November 16, 1900. Serial No. 36,766. (No model.)

*To all whom it may concern:*

Be it known that I, JOHN B. BLISH, lieutenant United States Navy, stationed at Washington, in the District of Columbia, have invented certain new and useful Improvements in Instruments for Navigating or Surveying; and I do hereby declare the following to be a full, clear, and exact description of the invention, such as will enable others skilled in the art to which it appertains to make and use the same.

My present invention relates to improvements in instruments for determining whether the observer is on, or approximately on, a line between two points, one in front and the other in rear of him, and also if not on that line for determining the angle subtended by the two points when the said points are almost one hundred and eighty degrees apart.

For measuring the angle just referred to an ordinary navigator's sextant or octant provided with the hereinafter-described prism attachment would be satisfactory, while when it is necessary merely to approximate this angle or to determine when the observer is approximately on the line referred to the ordinary binocular glasses or any form of hand-telescope fitted with the prism would be satisfactory.

Different modes of applying my invention are shown in the drawings.

Figure 3:
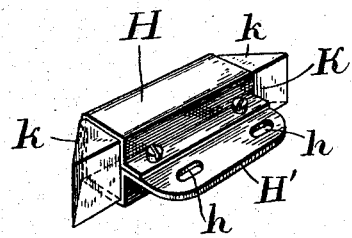

Figures 1 to 3 represent, respectively, the ordinary navigator's sextant in front and end elevation, parts being broken away, with prism attachment shown detached in Fig. 3. Figs. 4 and 5 represent a pair of binoculars fitted with the prism attachment. Fig. 6 represents an ordinary hand-telescope fitted with the prism attachment; and Fig. 7 represents a detachable ring for securing the prism attachment on the binoculars or the telescope, as shown in Figs. 4 and 6.

Referring now particularly to Figs. 1 and 3, A represents the frame of the sextant, B the index-bar carrying the vernier $b$, and C represents the tangent-screw. The telescope D is mounted in the usual way, as are also the horizon-glass E and the index-glass F. Secured to the index-bar B is a bracket G, carrying the clamp-screw G', which clamp-screw passes through one or the other of the elongated slots $h$ in the web H' of the metal frame H, which holds the prism K. This prism has two ends projecting from the metal frame, as shown in Figs. 1 and 3, and the reflecting-faces $k$ of the prism are at an angle of forty-five degrees with the parallel faces of the prism. By having these faces at an angle of forty-five degrees the reflection of the ray of light through the lower face is always parallel to the path of the ray of light striking the upper face, and therefore having these faces made at this angle obviates the necessity for nice adjustment and the side of the prism need not be parallel or at any given angle with the face of the index-glass F.

Since it might be difficult to get the faces $k$ of the prism at exactly the same angle without expensive workmanship, I provide the two elongated slots $h$ in the web H', and if the observations be taken first with the prism in one position—for instance, that shown in Fig. 1—and then turned upside down, with the clamp-screw G' engaging the other slot, the instrumental error due to the imperfections in the prism would be corrected if the mean of the two observations be taken.

In the use of the device shown in Figs. 1 and 2 the object in front is seen through the clear part of the horizon-glass somewhere on the line 1 2, while the image of the object in rear of the observer, following the line 3 4, strikes the upper reflecting-surface of the prism, is reflected down in the path 4 5, then is reflected back to the index-glass in the line 5 6, and then forward again to the silvered portion of the horizon-glass in the line 6 7, whence it is reflected back in the line 7 8. If the observer is in the exact line with the two objects, the lines 7 8 and 1 2 will coincide when the index-glass and the horizon-glass are parallel—*i. e.*, when the instrument reads zero—but if he is somewhat out of this line between the two objects the lines 7 8 and 1 2 will not coincide until the index-bar is moved through an angle equal to one-half the angle between the lines 1 2 and 3 4, which angle will be the reading of the sextant. Thus by using the sextant as aforesaid the observer can determine whether the ship is on the given line between two visible points, or, in other words, whether she is steering on a range, or, if not, how much she is off that range. When the objects are near or distinct, the telescope of the sextant may be omitted, the observer simply looking through the ring in which the telescope is ordinarily screwed.

Another important advantage secured by the invention as applied to a sextant is that it enables navigators to accurately measure the dip of the sea horizon and reduce his observations to the plane of the true horizon. Hitherto in making observations at sea the angle of dip has always been taken from a dip-table computed for various heights of the observer above the sea-level and for a normal atmospheric refraction. Now the height of the observer may not be known exactly in a seaway and the atmospheric refraction may differ considerably from the normal refraction on which the dip-table is based, and in consequence the angle of dip, and therefore the ship's position, may be considerably in error.

By the use of my improved attachment, however, the angle of dip can be accurately measured at the time of taking the observation, and the resultant position of the ship is freed from the unknown error, which may arise in using the computed angle of dip. To do this, the observer looks at the sea horizon in front of him and brings the reflected sea horizon in rear of him into coincidence by moving the index-bar when the reading of the sextant will be twice the angle of dip. By moving the prism endwise, repeating this observation, and taking the mean of the two any error in construction of the prism is eliminated. Having measured the dip, the prism is removed and the observation of the celestial body is made.

It is true that the correction for refraction in altitude of the celestial body observed must be applied; but this correction is small and rapidly decreases as the altitude of the body increases and can involve only an insignificant error except at very low altitudes of the celestial body as far as the ordinary work of navigation is concerned.

In case it is not desired to measure the angle subtended by the objects in front and in rear of the observer, but merely to ascertain whether the observer is or is not on the range or line between the two objects or whether only a rough approximation of the distance the observer is away from the line is required, my invention may be applied to ordinary binoculars, spy-glasses, or even the detached telescopes of sextants or other like optical instruments, as shown, for instance, in Figs. 4 to 7. In these figures the frame H is provided with an arm H², secured to the web $m'$ of the detachable band M' by means of the clamp-screw G', as shown in Figs. 4, 6, and 7. The path of the ray of light then coming in the direction of the line 9 10 is reflected to the point 11 and then reflected back into the telescope or binocular. If the reflected image coincides with the direct image, then the two objects are exactly in the same line. If the two objects are both in the field of view, the distance that the observer is out of the line may be roughly estimated by the distance apart of the two objects, and observing this distance that the two objects appear separated in the field of view the observer may place himself or his vessel closer to or farther from the range, as he may desire.

It will be noted that with the sextant the ray of light from the object in the rear passes over or under the head of the observer, while with the binoculars or telescope it will ordinarily be more convenient to have the prism project from the side of the head of the observer, so that the ray from the rear may pass to one side of the observer's head and not above it. This, however, is merely a matter of detail, which in no way affects the true nature of the invention. It will also be evident that a simple ring or hollow tube with or without cross-hairs therein may be substituted for the telescope or binocular glasses, in which case the observer sees the object itself in front of him through the tube or ring and the image of the object in rear of him reflected from the prism, and the distance between the two objects in the field of vision will approximately indicate the distance the observer is out of the line.

For convenience in drawing the claims we will call the tube, ring, or telescope through which the direct object is seen the "eye-tube."

It will be observed that various other modifications in the herein-described apparatus might be made which could be used without departing from the spirit of my invention.

Having thus described my invention, what I claim, and desire to secure by Letters Patent of the United States, is—

1. In an instrument of the character described, the combination with an eye-tube arranged for the observer to see ahead of him, of a prism and reflecting-surfaces so arranged as to simultaneously cast images of objects in rear of the observer into said eye-tube, substantially as described.

2. In an instrument of the character described, the combination with an eye-tube with lenses therein arranged for the observer to see ahead of him, of a prism and reflecting-surfaces so arranged as to simultaneously cast images of objects in rear of the observer into said eye-tube, substantially as described.

3. The combination with a navigator's sextant or octant, of a prism secured to the index-bar and so arranged as to reflect the image of an object behind the observer into the index-glass, whence it is reflected into the horizon-glass, and thence into the eye-tube, substantially as described.

4. The combination with a navigator's sextant or octant, of a prism having faces inclined approximately at forty-five degrees and secured to the index-bar and so arranged as to reflect the image of an object behind the observer into the index-glass whence it is reflected to the horizon-glass, and thence to the eye-tube, substantially as described.

5. The combination with a navigator's sextant or octant, of a prism secured to the index-bar and so arranged as to reflect the image of an object behind the observer into the index-glass, whence it is reflected to the horizon-glass, and thence into the eye-tube, with means for holding said prism in either of two positions, that is with its longitudinal axis shifted through one hundred and eighty degrees in the latter position from that in the first, substantially as described.

6. The combination with a navigator's sextant or octant, of a removable prism, reversible endwise and having faces inclined approximately at forty-five degrees, secured to the index-bar and so arranged as to reflect the image of an object behind the observer into the index-glass, whence it is reflected to the horizon-glass, and thence into the eye-tube, substantially as described.

In testimony whereof I affix my signature in presence of two witnesses.

JOHN B. BLISH.

Witnesses:
R. E. LOGAN,
WM. L. LARASH.